United States Patent [19]

Dunkerton et al.

[11] Patent Number: 4,600,922
[45] Date of Patent: Jul. 15, 1986

[54] PAGING UNIVERSAL REMOTE CONTROL ENCODER

[75] Inventors: Stephen H. Dunkerton, Riverwoods, Ill.; David R. Petreye, Margate, Fla.; Gary D. Erickson, Mt. Prospect; Gary R. Reynolds, Oakwood Hills, both of Ill.

[73] Assignee: Motorola, Inc., Schaumburg, Ill.

[21] Appl. No.: 774,833

[22] Filed: Sep. 11, 1985

Related U.S. Application Data

[63] Continuation of Ser. No. 487,490, Apr. 22, 1983, abandoned.

[51] Int. Cl.4 .......................... H04Q 9/00; H04B 1/10
[52] U.S. Cl. ................................ 340/825.44; 455/194;
455/221; 455/54; 340/825.48; 179/2 EC
[58] Field of Search ...................... 340/825.44, 825.48;
455/36, 54, 78, 194, 212, 221; 179/2 EB, 2 EC;
358/85

[56] References Cited

U.S. PATENT DOCUMENTS 4,330,866  5/1982  Malchow .......................... 455/194
4,419,668 12/1983  Ganucheau, Jr. .............. 340/825.48
4,501,017  2/1985  Higgins et al. ................ 340/825.44
4,525,867  6/1985  Shiratani ........................... 455/221

Primary Examiner—Donald J. Yusko
Attorney, Agent, or Firm—James E. Jacobson, Jr.; Edward M. Roney; Donald B. Southard

[57] ABSTRACT

A paging station remote control system encoder is described. The paging system encoder generates signals in accordance with a predetermined signalling scheme comprising a series of tones and timed pauses and generated in response to control signals supplied either manually or by a paging terminal. The paging system encoder provides control signals which instruct a paging transmitter station to key in the analog or binary modulation mode or to switch from one mode to another without first dekeying the paging transmitter.

9 Claims, 23 Drawing Figures

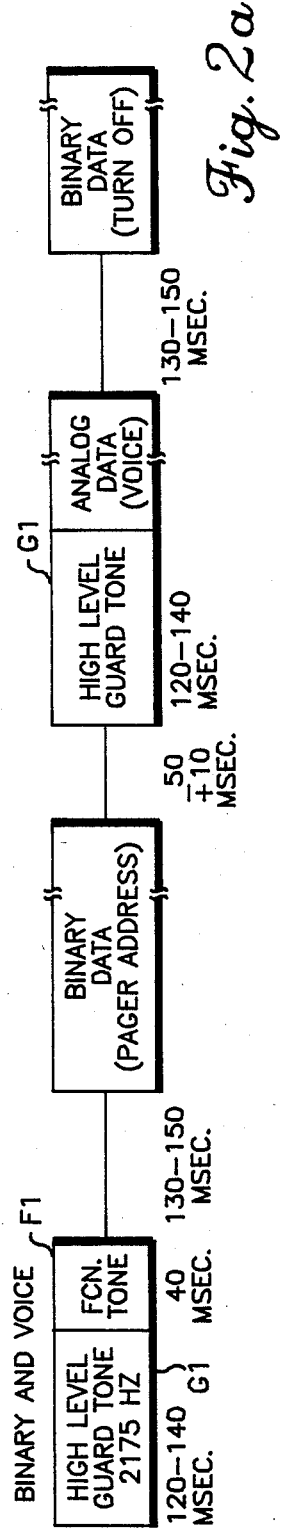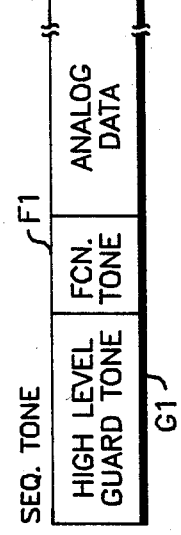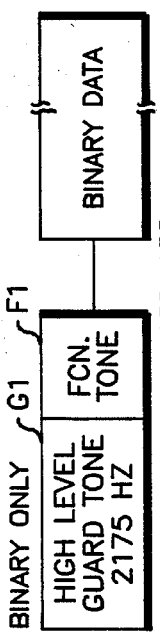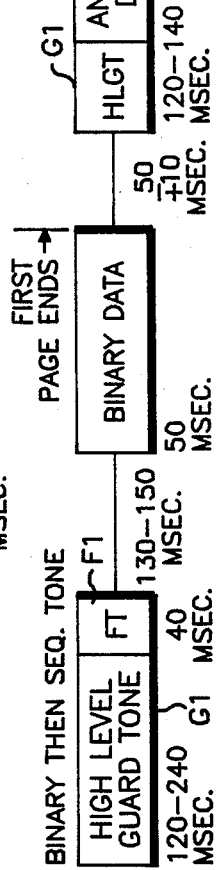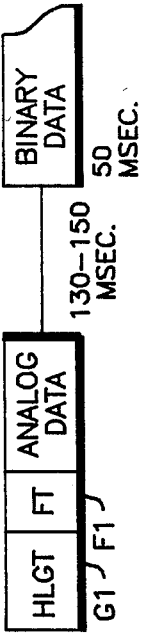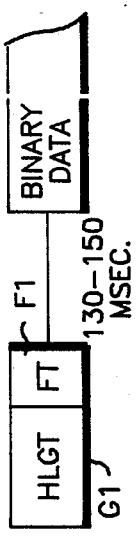

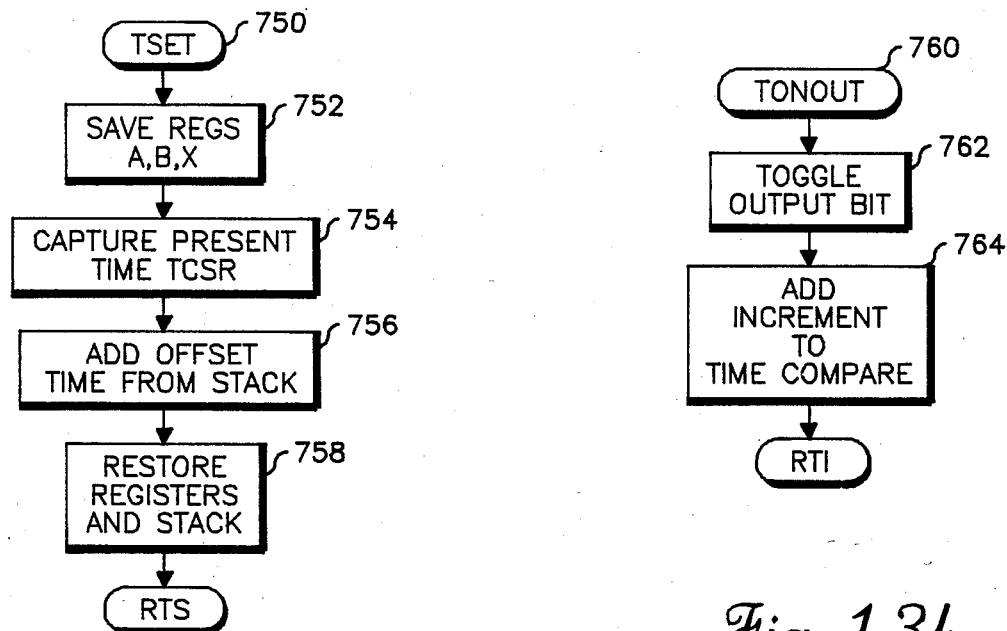
*Fig. 13a*
*Fig. 13b*
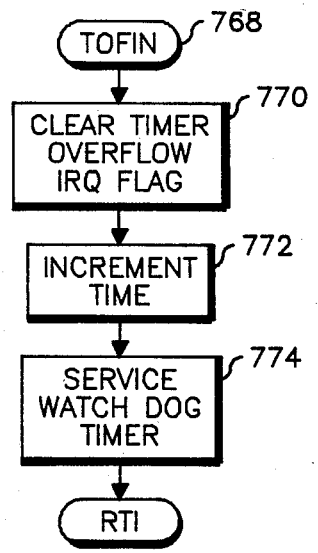
*Fig. 13c*

PAGING UNIVERSAL REMOTE CONTROL ENCODER

This is a continuation of application Ser. No. 487,490 filed Apr. 22, 1983, abandoned.

BACKGROUND OF THE INVENTION

This invention relates to the field of the paging base station and terminal communications using both binary signalling and analog signalling, and more particularly to the signalling scheme and apparatus for implementing a base station and terminal communications link for interactively transmitting both binary and analog signals.

In the past a paging base station was required to dekey its transmitter when changing from transmission of an analog signal to transmission of a binary signal or vice versa. To initiate an analog page, conventional paging systems utilize a sequence of a high level guard tone signal, a function tone signal and a tone or voice signal accompanied by a low level guard tone signal. To enter a binary paging mode, a prior art remote control paging encoder removes all activity from the remote control link for at least 300 ms causing the transmitter to dekey. The transmitter then rekeys in the binary mode after the remote site received a burst of FSK paging signals from the paging system encoder, equivalent to a binary comma for 100 ms.

A prior art paging system of this type is described in Motorola document number 68P06905B33 (1980) entitled "MICOR Tone and Binary Paging Transmitter Station." This instruction manual is available from the Service Publication Department of Motorola, Inc., 1301 East Algonquin Rd., Schaumburg, Ill., or from Motorola C & E Parts, 1313 East Algonquin Rd., Schaumburg, Ill.

This is disadvantageous in certain respects. By requiring dekeying of the transmitter, a signal such as a binary page followed by a voice message must be dekeyed after the binary signal and then rekeyed for the analog voice portion of the transmission and then dekeyed again and rekeyed for a binary end of transmission message. The result of this was a noise burst at the end of the voice message and prior to the binary turn-off code for the pager. The noise burst resulted from the loss of carrier from dekeying the transmitter.

It is well known that different modulation techniques are necessary for the appropriate transmission of binary and analog signals. Therefore, it is desirable to have a technique whereby both analog and binary signals can be sent to a pager by way of different modulation schemes without first dekeying the paging base station. Moreover binary pagers with voice messages require the base station to quickly transfer from an analog modulation mode to a binary modulation mode, and vice versa. Therefore, it is important to provide a signalling scheme whereby the base station can perform such a transition with a minimum of effort and without introducing extraneous signals that might be picked up by the binary pager. Also, dekey/rekey reduces system thru-put which is undesirable on heavily loaded channels.

SUMMARY OF THE INVENTION

Briefly described, the present invention contemplates a paging system remote control encoder which generates and transmits a signalling scheme comprising a series of tones and timed pauses. The paging system encoder transmits a first and second control tone for a predetermined period of time. If an analog modulation mode is desired, the paging encoder immediately transmits an analog information signal. If a binary modulation mode is desired the paging encoder generates a pause and then in response to a binary input, transmits a binary information signal.

To initiate a binary modulation mode, the paging encoder generates a pause immediately following the second control tone, and in response to a binary signal transmits a binary information signal.

It therefore is an object of this invention to provide an improved paging system encoder which rapidly instructs a paging base station to key in an analog or binary modulation mode.

It is a further object of this invention to provide an improved paging system encoder.

It is a further object of this invention to provide a paging encoder which allows a paging base station to switch from an analog to a binary modulation mode without first dekeying the transmitter in order for the base station to make a transition from one transmission state to the other.

BRIEF DESCRIPTION OF THE DRAWINGS

FIGS. 2a-f show a specifically formatted signalling scheme used in a communication link between a paging terminal and a paging base station which incorporates an encoder according to the invention.

FIGS. 4 through 15 are flow diagrams which define the operation of the microcomputer used in the encoder of FIG. 3.

DETAILED DESCRIPTION OF THE PREFERRED EMBODIMENT

Figure 1A:
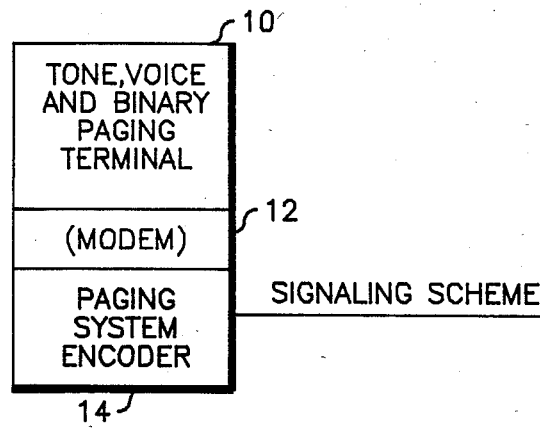
FIGS. 1a and 1b are block diagrams of two paging systems of the type which utilize an encoder according to the present invention.

FIG. 1 shows a block diagram of a paging system of the type which embodies the signalling scheme utilized in the present invention. The illustrated paging system includes a paging terminal (10) adapted to provide analog or binary paging signals. The paging terminal interfaces with a modem 12 and a paging system encoder 14. The modem 12 is a conventional device which converts a binary signal from the paging terminal 10 to a frequency-shift keying (FSK) signal used by the station encoder 14. The paging terminal 10 cooperates with the paging system encoder 14 by providing signals to the encoder 14 which indicate that the paging terminal 10 is about to transmit binary or analog signals. The encoder 14 then signals the paging terminal 10 when the encoder is ready to receive either type of signalling. An exact description of the paging terminal and the interface signals required by the paging system encoder are described in Motorola document 68P81063E15 (1982) entitled "Simulcast System Controller and PURC Station Controller" available from the Service Publication Department of Motorola, Inc., 1301 East Algonquin Rd., Schaumburg, Ill. or from Motrorola C & E Parts, 1313 East Algonquin Rd., Schaumburg, Ill.

The encoder 14 then generates a series of tones and timed pauses which are especially formatted and communicated to a paging base station which includes station decoder 16. The paging system decoder is described in copending patent application entitled Paging Universal Remote Control Decoder by Dunkerton et al., Ser. No. 487,488 filed Apr. 22, 1983 and assigned to the assignee of the present invention. The decoder 16 converts the formatted signals from the encoder 14 and selectively activates modem 18 and transmitter 20 in predetermined timed sequences as determined by the signals from the encoder 14. The paging transmitter 20 can then be seletively switched between analog or binary transmissions in response to the signals received from the encoder 14.

Figure 1B:
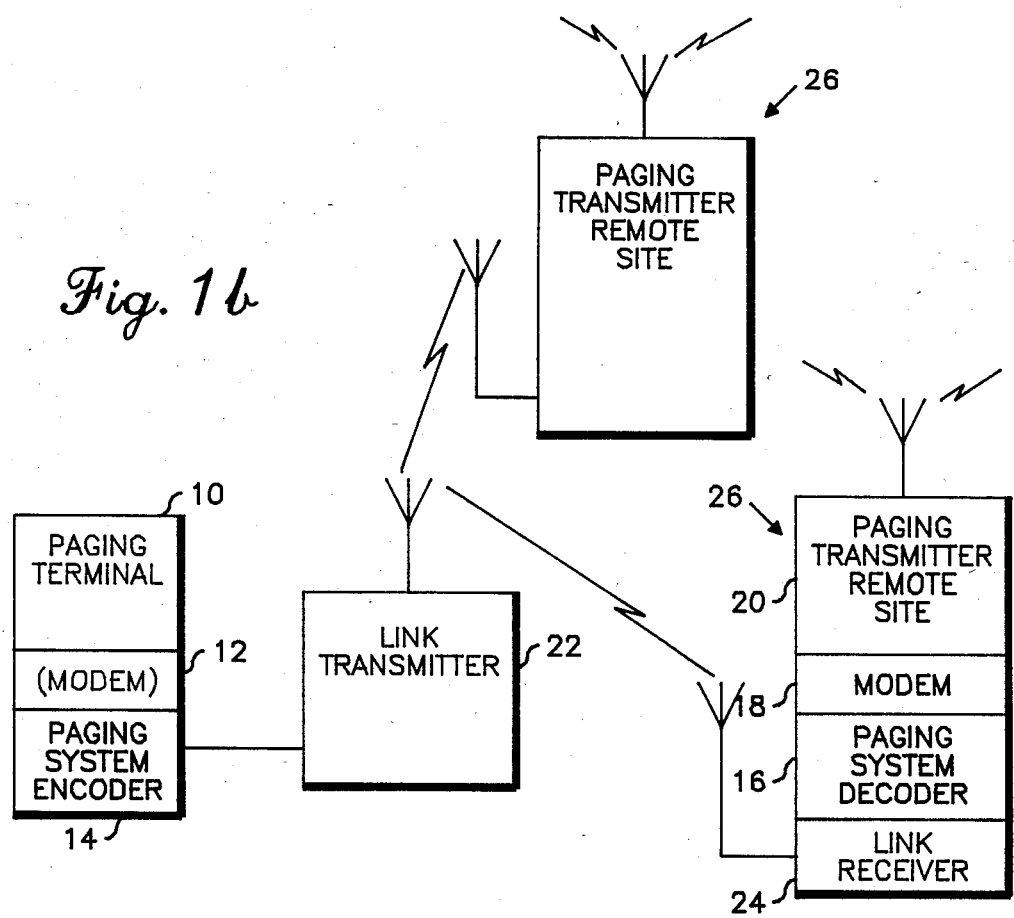

The paging system encoder and decoder can be connected in several ways. FIG. 1a shows an encoder and decoder being connected through a terrestrial wire-line. Referring now to FIG. 1b, the paging system encoder and decoder can also be connected through a communications link provided by a radio link transmitter 22 and a radio link receiver 24. In addition, the paging system signalling scheme can be expanded to control any number of simulcast paging transmitter remote sites 26, as shown in FIG. 1b.

The signalling scheme shown in FIG. 2 has been developed to unify the base station control functions required in paging systems utilizing both binary and analog signalling. Most commonly, the analog signalling is in the form of sequential tone signalling. For the base station there are three modes of operation: (1) binary (FSK signalling), (2) audio (sequential tone signalling or tone and voice signalling), and (3) combinations of both binary and audio signalling.

Control of the paging base station is accomplished from paging terminal 10 which operates in conjunction with the paging system encoder 14 and is located either remotely or locally with respect to the paging transmitter 20. FIGS. 2A through 2F show that the station control sequence is preferably initiated by a high level guard tone of 2175 Hertz for a period of 120 to 140 milliseconds followed immediately by a 40 millisecond tone F1 of 1950 Hertz. These two sequential tones are transmitted by the encoder 14 and are intended to signal the base station to turn on its transmitter in preparation for transmitting a binary or analog signal to a pager unit. The paging base station need only be rekeyed if more than 350 milliseconds have lapsed since the last transmission.

A combination of binary data and analog data transmission is required for paging systems with mixed binary and tone signalling or tone and voice pagers which use binary signalling. The timing scheme in FIG. 2A through 2F allows interactive analog and digital paging without dekeying the transmitter. FIGS. 2A through 2F show the time spacing of analog and binary signals that are preferred for the paging base station to respond appropriately. In FIGS. 2A, 2B, 2D and 2E it can be seen that for transmission of a binary signal after a high level guard tone-function tone is sent, a pause of 130 to 150 milliseconds is preferably inserted into the transmission before sending the binary data. The pause of a 130 to 150 milliseconds tells the decoder at the paging base station that there is no analog data and it allows transfer to a binary modulation mode upon receipt of binary data.

If analog data is to be sent immediately following a binary data transmission, a pause of 50 milliseconds is inserted between the end of the binary data and the beginning of the high level guard tone signal (G1). This insures that the paging base station has sufficient time to return to a condition in which it can sense a high level guard tone. Note in FIG. 2A that after the binary data has been received and transmitted by the paging base station and a pause of approximately 50 milliseconds has elapsed, only the high level guard tone need be transmitted to the paging base station to enable the paging base station in a analog modulation mode. The function tone is no longer necessary since the paging base station has been keyed previously and insufficient time has elapsed between pages to cause the base station to dekey.

Referring to FIG. 2A, a remote or local terminal transmits to a paging base station a guard tone function tone sequence G1, F1 to instruct the base station transmitter to key. After the guard tone-function tone sequence has been transmitted to the paging base station and has been received by it, the paging base station is immediately in a modulation mode that is appropriate for analog data. FIG. 2C illustrates this condition. Binary data is sent only after a 130 to 150 millisecond pause after the guard tone-function tone sequence. The binary data is sent to the base station via a modem 202 format (1200/2200 Hertz signalling) which is well known. Audio data may be sent immediately after the guard tone-function tone sequence along with a low level guard tone.

To initiate an analog modulation mode, a pause of approximately 50 ms, for example, follows the termination of the binary data transmission before the high level guard tone is again transmitted. Immediately following the second high level guard tone, the analog data (in this case a voice) is sent to the base station along with low level guard tone (not shown). A binary turn-off code ends the transmission to the binary pager and follows the voice message after a 130 to 150 millisecond pause in order for the paging base station to know that it may transfer to a binary modulation mode for the turn off code.

FIG. 2B shows the transmission of a binary only page. The base station is again keyed by a high level guard tone-function tone sequence. The appropriate 130 to 150 millisecond pause then follows the function tone. The pause tells the paging base station that there is no analog data and it may transfer to a binary modulation mode in anticipation of the binary data. The paging base station then receives the binary data after it has transferred to its binary modulation mode.

FIG. 2C shows the timing scheme for a sequential tone page. The high level guard tone-function tone sequence again keys the base station. This time the analog data is immediately transmitted after the function tone since the paging base station is in a analog modulation mode immediately following the function tone. Once analog information is received in the time period immediately following the function tone, the paging base station will stay in an analog modulation mode until it receives a 130 to 150 millisecond pause.

FIG. 2D shows a binary page followed by a sequential tone page. The first portion of the signal stream is the same as shown in FIG. 2B. After the binary data has been sent and received by the paging base station, a pause of about 50 milliseconds is inserted into the transmission stream to enable the paging base station to condition itself to receive a high level guard tone. The high level guard tone is transmitted from the paging system encoder and received by the paging base station. The paging base station immediately goes to a analog modulation mode and modulates the analog data which is immediately received after the high level guard tone.

FIG. 2E shows the signalling for multiple binary pages sent without pause. The timing scheme for multiple binary pages is essentially the same for a single binary page as shown in FIG. 2B. Binary data is simply sent one after the other without pause after the initial 130 to 150 millisecond pause.

FIG. 2F shows a sequential tone followed by a binary page. Again the high level guard tone-function tone sequence keys the paging base station transmitter and also causes the paging base station to enter an analog modulation mode. The analog data is transmitted from the paging terminal immediately following the function tone and thus the analog data is appropriately modulated. The binary data is sent only after the completion of the analog data and a 130 to 150 millisecond pause.

In the preferred embodiment, the analog signal from the paging terminal is summed with a control tone that is preferrably the same as the high level guard tone, only at a reduced amplitude.

In summary, to enable the binary mode after the high level guard tone-function tone sequence has been transmitted, a pause of 130/150 millisecond duration is inserted before sending the binary signal. If multiple binary pages are to be transmitted, the binary data identifying each pager should be sent in sequence without pause. Upon completion of the transmission of the binary information, approximately 50 millisecond pause must be sent before enabling the audio control in the paging base station. After the 50 millisecond pause a high level guard tone is sent to the paging base station to enable the analog-audio mode. (Note: No function tone is needed after the initial station control set-up). If the paging base station does not receive a signal for a period of 350 milliseconds, the base station will automatically dekey.

If a binary signal is to be transmitted following an analog/audio signal, the sequence described above must be repeated. That is to say, 130 to 150 millisecond pause must follow the guard tone before the binary data is delivered to the pager base station.

Figure 3:
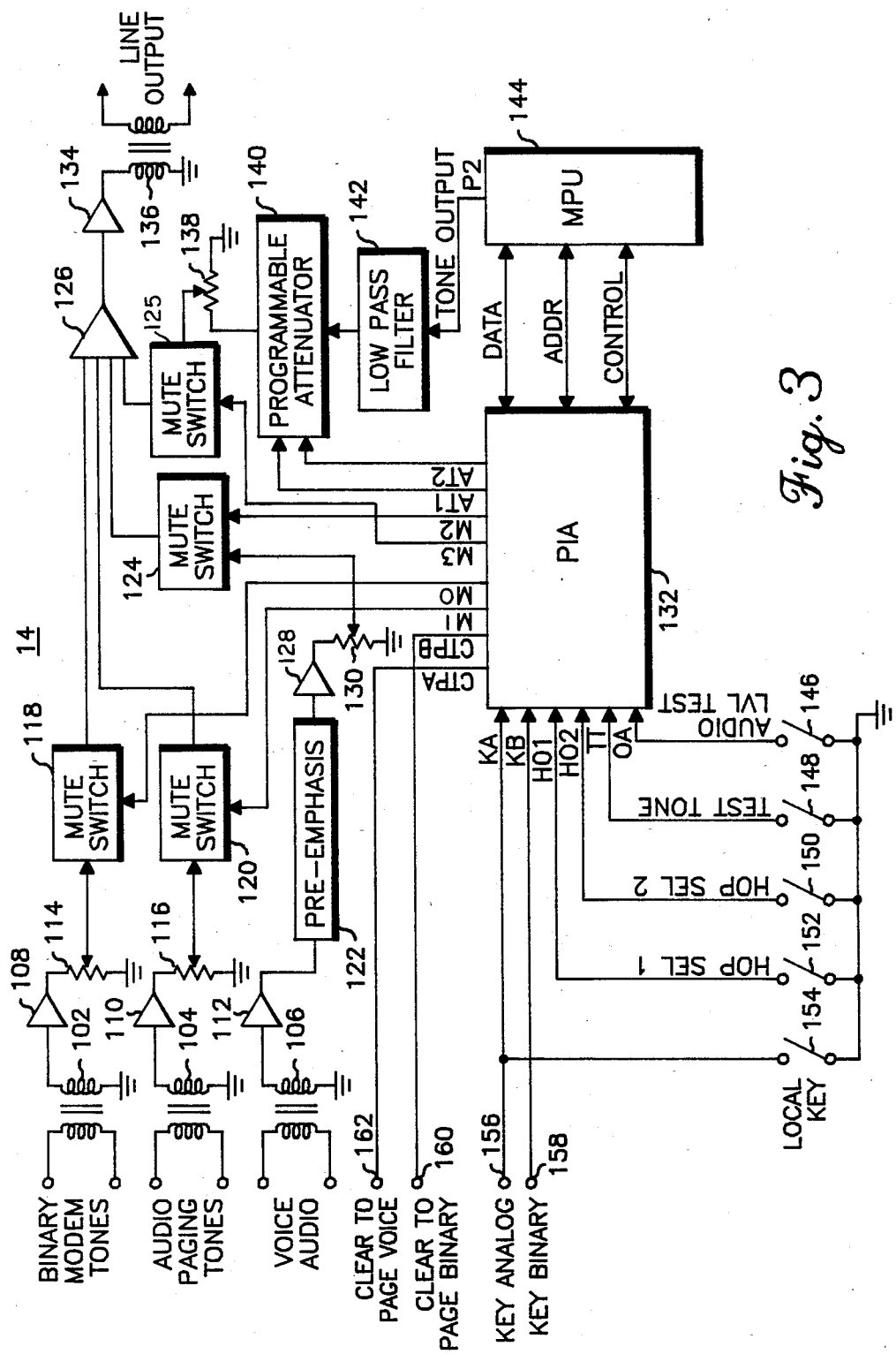
FIG. 3 is an electrical schematic of an encoder which generates the required signalling illustrated in FIG. 2 to the paging base station.

FIG. 3 is an electrical schematic of an encoder which can generate the required signalling scheme of the present invention. A more detailed electrical schematic of the encoder circuit of the present invention is illustrated in Motorola document 68P81063E15 entitled "Simulcast System Controller and PURC Station Controller," available from the Service Publication Department of Motorola, Inc., 1301 East Algonquin Rd., Schaumburg, Ill., or from Motorola C & E Parts, 1313 East Algonquin Rd., Schaumburg, Ill. In accordance with the present invention the various outputs of a paging terminal are provided to the respective binary, audio and voice inputs of the paging system encoder. The signals are interfaced through transformers 102, 104 and 106 respectively, which provide impedance matching and isolation between the paging terminal and the paging system encoder. The transformers 102, 104 and 106 are then connected to buffer amplifiers 108, 110 and 112 which compensate for gain losses in the binary modem tones, paging tone and voice audio signals. The amplifiers 108 and 110 are connected to variable resistors 114 and 116 which provide further compensation between the various paging signals. It is desirable to adjust the binary modem tone, audio paging tones and voice audio tones so they are substantially equal in amplitude when they are connected to summing amplifier 126. The amplifier 112 is connected to a preemphasis network 122 which conditions the voice audio signal and provides a standard frequency shaping used to transmit paging voice audio to remote paging transmitters. The preemphasis network is then coupled to an amplifier 128 and a variable resistor 130 to compensate for gain variations in this signal path. Amplifier 128 also includes a match filter to remove the guard tone frequency. The variable resistors 114, 116 and 130 are then coupled to electronic mute switches 118, 120 and 124. Mute switches 118, 120 and 124 can be any type electronic switch adapted to pass an electrical signal in response to an electrical control signal. The mute switches 118, 120 and 124 are coupled to and controlled by a peripheral interface adaptor circuit (PIA) 132.

The outputs of mute switches 118, 120 and 124 are coupled to a summing amplifier 126 which combines the various signals in equal proportions. The summing amplifier is then coupled to an output amplifier 134 which is coupled to a transformer 136. The amplifier 134 and transformer 136 convert the output signal of summing amplifier 126 to a signal of amplitude and impedance required by the wire-line hookup or transmitter link used to couple the paging system encoder 14 to the paging system decoder 16.

The summing amplifier 126 also receives an input through mute switch 125 from the variable resistor 138 which is coupled to a programmable attenuater 140. The programmable attenuator 140 is coupled to two control signals from the peripheral interface adaptor 132 and a tone input from the low pass filter 142. The low pass filter 142 is coupled to a microcomputer 144. The microcomputer 144 generates the various control tone sequences of the paging system encoder and provides signals to the programmable attenuator 140 through PIA 132 to control the amplitude of the control tones coupled to the summing amplifier 126. The microcomputer 144 and the PIA 132 also control the operation of the mute switches in response to several input signals in accordance with the signalling scheme of the present invention. The present invention utilizes a widely used microcomputer integrated circuit designated MC6803 and available from Motorola, Inc. The companion peripheral interface adapter integrated circuit is designated MC6821 and is also available from Motorola, Inc.

The paging system encoder 14 is configured to provide direct user control via several switches, 146 through 162, which are disposed on a panel which is accessable to the user of the encoder. The switches 146, 148, 150, and 152 are connected to input ports of the PIA 132. Switch 146 when closed will cause the paging system encoder to enable the tone, modem and voice paths to be enabled simultaneously to the output terminal transformer for audio level set. Likewise switch 148 when closed will cause a series of audio test tones, generated by microcomputer 144 to be placed at the output terminals of the encoder. Switches 152 and 150 are included with the paging encoder circuit to allow the paging system to accommodate additional RF link transmitters to be used in a simulcast system. For example, if a paging transmitter site is located a large distance from the paging terminal site, a repeater site will be included in the system. Each repeater site will require a certain amount of time to allow the repeater transmitter to key and therefore the high level guard tone must appear for an extended time to allow retransmission to the paging transmitter site. Each link site requires approximately 250 ms to retransmit the high level guard tone. Switches 150, 152 are configured to provide a binary encoded input to the encoder circuit which activates an additional guard tone period to be generated by the paging encoder. The high level guard tone signal can be increased in 300 ms increments, and a maximum of 1200 ms can be effected by switches 150, 152. If both switches 150 and 152 are open, no high level guard tone will be added to the normal tone sequence. If switch 150 is open and switch 152 is closed, 300 ms of high level guard tone will be added to the initial tone sequence. Likewise, increments of 300 ms can be added to the high level guard tone sequences by providing the various combinations of switches 150 and 152.

The paging system encoder circuit cooperates with the paging terminal 10 of FIG. 1, through the clear to page voice terminal 162, the clear to page binary terminal 160, the key analog terminal 156 and the key binary terminal 158. In operation, a paging subscriber will activate the paging terminal 10 of FIG. 1, through a telephone link by signalling the telephone number assigned to the unique pager address. The paging terminal 10 will then convert the telephone number to a signal comprising the exact pager address. The paging terminal 10 then signals the paging system encoder that a paging signal is imminent by activating either the key analog terminal 156 or the key binary terminal 158 depending on the type of pager being signalled. If the key binary terminal is activated, the paging system encoder will generate the series of timed tones and pauses which place the paging remote transmitter in the binary transmission mode. When the transmitter has been properly set up and keyed, the paging system encoder will activate the clear to page binary terminal, and activate the binary modem tone mute switch 118 to pass modem tones to summing amplifier 126 and output transformer 136. Similarly, if the system is to be placed in the analog audio transmission mode, the paging terminal will activate the key analog terminal 156 and the paging system encoder will generate the series of timed tones and pauses which place the paging remote transmitter in the analog transmission mode.

Figure 4:
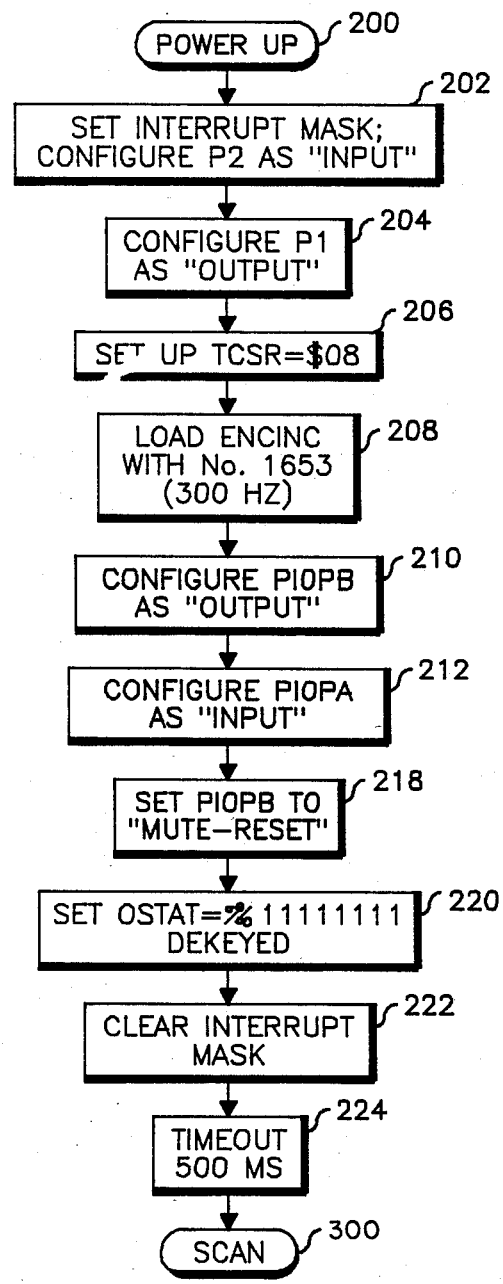

FIGS. 4 through 16 are flow diagrams which define the operation of the microcomputer 144 used in the encoder of FIG. 3. FIG. 4 details the operation of the initial program sequence when power is first applied to the paging encoder. Since it is not possible to predict a specific logic condition which will be present at any particular input or output terminal of the microprocessor or PIA, the power-up sequence of FIG. 4 establishes known conditions on all critical input and output terminals.

When power is first applied to the paging encoder 14, the program control of the microcomputer is configured to execute an initialization program 200. The program control then proceeds to item 202 and immediately sets the microcomputer interrupt mask which insures the program will not be interrupted during the power-up sequence. The program then initializes all random access memory variables.

The microcomputer 144 ports can be configured to function as either inputs or outputs to the microcomputer and must be configured according to program control. As noted in FIG. 3, the microcomputer 144 acts as the tone sequence generator for the paging system encoder. Any tones which may be present at port P2 of FIG. 3 are shut off during the power-up sequence 200 by designating port P2 as an input. This step insures no tones are placed on the output of the encoder circuit until necessary.

The microcomputer 144 provides an internal tone generator which is controlled according to the state of an internal register. By entering a numerical value in the ENCINC register, a corresponding tone period will be generated by the tone circuit. According to the next item 206, the timer control and status register are initialized and subsequently, an number is loaded into the TCS register, so that the tone output is initialized. The power-up sequence next designates the PIA ports as input or outputs.

Referring now to FIG. 3, signals KA, KB, HO1, HO2, TT and OA are coupled to PIA port A. Likewise, signals CTPA, CTPB, M0, M1, M2, M3, AT1, AT2 are coupled to PIA port B. In accordance with the present invention, FIG. 4 shows the PIA port configuration. Consequently item 210 configures PIA port A as an input and PIA port B configures as an output. The power-up sequence next initializes the values associated with PIA port B by placing the code on the PIA port B 218 which corresponds to opening or inhibiting all mute switches 118, 120, 124, 125 of FIG. 3, inhibiting the clear to page signals 160, 162 of FIG. 3 and by adjusting the programmable attenuator 140 of FIG. 3 for maximum attenuation.

The paging system encoder makes decisions as to what subsequent actions to effect based on two integral system status Bytes which are an indication of the system's past and present activity. The system status bytes are designated New Status (NSTAT) and Old Status (OSTAT). Since the system operation will be affected by the old system status, for instance an analog to binary transition, this byte must be initialized during the power-up sequence. Item 220 sets the system status byte OSTAT to a code comprising all binary ones, which indicate that the system is currently dekeyed.

The paging system encoder is now configured with initial conditions in critical areas which will ensure correct system operation. Subsequently, the interrupt mask is cleared 222, thus allowing the microprocessor to execute interrupt commands. Timeout period 224 is provided to allow all initial conditions on the system to stabilize. The paging encoder now enters the SCAN mode 300.

Figure 5A:
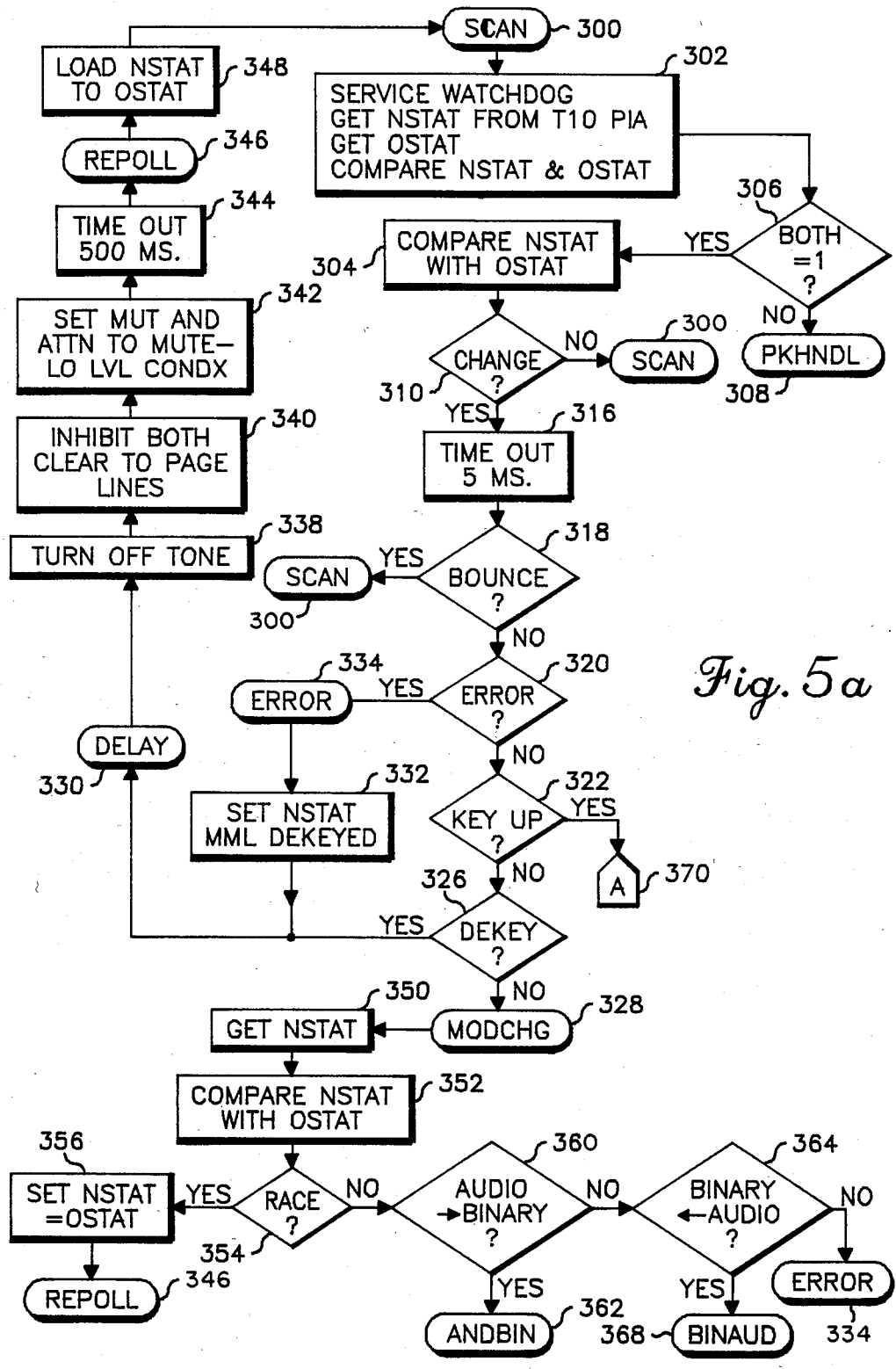

Referring now to FIG. 5, there is illustrated a flow chart embodying the scan method of the present invention. The flowchart in FIG. 5 provides a detailed description for the process steps necessary for implementing the scan method of the present invention in the paging system encoder 14 in FIG. 3. The scan routine forms the basic background operating scheme of the present invention. The primary task for the scan routine interprets key input commands from either hardware front panel switches or from the paging terminal and exits to one of five tasks depending on the condition of the key switches.

When the scan routine is activated, item 302 retrieves the system status bits D6 from the systeem status bytes NSTAT and OSTAT.

Referring now to decision 306, if both system status bytes NSTAT and OSTAT show a binary 1 in D6, which is an indication of the hardware panel key switch, then the system is dekeyed, and program will enter item 304. If either data bit D6 from NSTAT or OSTAT is a binary zero, the hardware panel key switch has been changed and the program will enter the panel key handler (PKHNDL) routine 308. Item 304 retrieves the system status bits D1 and D∅ from the system status bytes NSTAT and OSTAT. Status bits D∅ and D1 of NSTAT indicate whether the paging system encoder is being signalled, that is either an analog or binary paging signal is imminent from the paging terminal 10 or modem 12 of FIG. 1. Decision 310 then compares system status bits D1 and D∅ which indicate if a key command has been received from the paging terminal. If NSTAT has not changed from the previous period OSTAT, the program returns to the initial item of the scan routine and continues searching for a change.

If NSTAT has changed the system will enter item 316, which provides a 5 ms time delay. This time delay provides enough time to detect a key bounce or an erroneous input. Decision 318 compares the key bit D∅ or D1 with the state of the key bit D∅ or D1 5 ms earlier. If a key bounce is detected, decision 318 returns program control to the first step of the scan routine.

If a key bounce was not detected, the program proceeds to decision 320 which examines the D∅ and D1 status bits in the OSTAT status byte. If the D∅ and D1 status bits show 00 which is an impossible condition at this point in the program, the program control will exit decision 320 and proceed to error routine 334. If an error is not detected the program proceeds to decision 322. If the system has been previously keyed in either the analog or binary mode, the program will proceed to decision 326. If the system was not previously keyed, the program will exit the scan routine and proceed to the select modulation (SELMOD) routine 370, which will be discussed in more detail later.

As noted previously, if the paging system has been previously keyed the program will proceed to decision 326. At this point, the paging system will either dekey or change transmission modes.

If the system status bits D1D0 of NSTAT and OSTAT indicate the sytem was previously keyed and is now required to dekey, the program will proceed to the dekey routine 330. Alternatively, if the system status bits D1D0 of NSTAT and OSTAT indicate the system should remain keyed, but in another mode, the system will enter the modulation change routine 328.

The modulation change routine 328 occurs in mixed paging systems when binary pages are sent immediately after a tone-signalled page or visa versa. As previously discussed, mode information is carried on the system status bits D1D0. Item 350 retrieves the NSTAT status bits D1D0. Item 352 compares the NSTAT status bits with the OSTAT status bits. If the NSTAT status bits D1D0 are both equal to binary zeros, a race condition or overlapped key request is indicated. Decision 354 will then pass program control to item 356 which will then update the NSTAT status byte to the current valve of OSTAT and subsequently select the status update routine (REPOLL) 346.

If either NSTAT or OSTAT contains a binary one in D1DO, the program will proceed to decision 360. If the OSTAT status bits D1D0 show 10 and the NSTAT status bits show 01, an analog to binary transition is indicated, and decision 360 will select the AUDBIN routine 362, which will be discussed in more detail later. If AUDBIN is not selected, the Program will proceed to decision 364. If the OSTAT status bits D1D0 show 01 and the NSTAT status bits show 10, decision 364 will select the binary to analog transition routine (BINAUD) 368. If BINAUD is not selected, an error has occurred and decision 364 will select the error routine 334.

If the error routine 334 is selected, Item 332 will reset the NSTAT status byte value to the normal value (D1D0=11) indicating the system should be dekeyed. The Item 332 then selects the dekey routine 330.

When invoked, dekey routine 330 will execute the tasks required to dekey or turn off the paging transmitter stations and reset the paging encoder 14 for the next key-up sequence. The dekey routine begins with item 338 which designates microcomputer port P2 of FIG. 3 as an input, thus turning off any tone appearing on the port. The program proceeds to items 340 and 342 which updates the PIA port B bit status instruction so that the audio mute switches 118, 120, 124 and 125 of FIG. 3 are set to mute the signal paths, and so that the programmable attenuator is set for maximum attenuation. The program proceeds to item 344 which provides a waiting period required by the paging system to dekey. Item 344 then proceeds to the REPOLL routine 346. This routine is the end of the background loop. It updates the current status of the paging system encoder. Item 348 replaces the contents of the OSTAT register with the NSTAT status values, and then returns the program to the beginning of the SCAN routine 300.

Figure 5B:
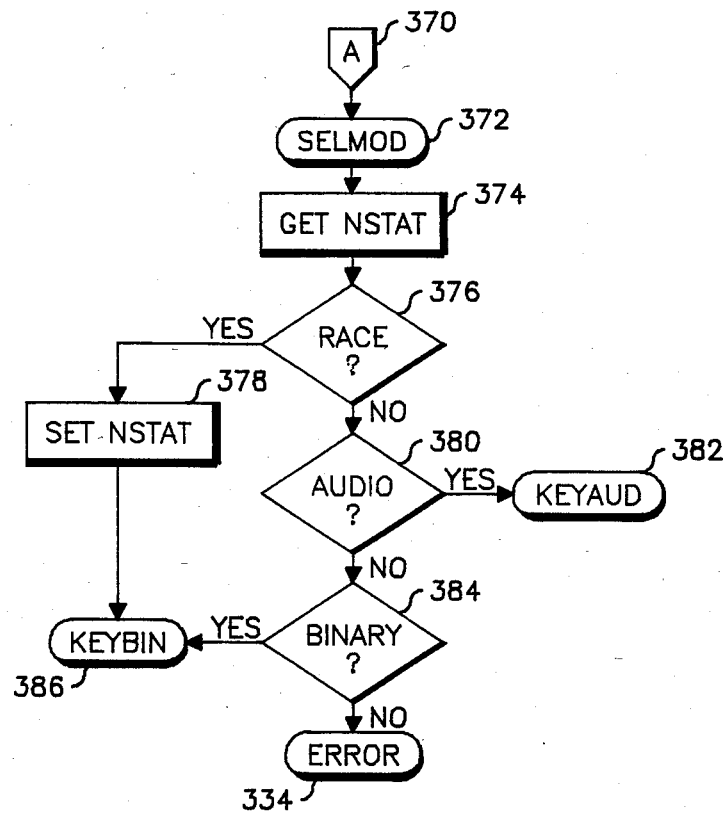

Referring now to decision 322, if the system status bits indicate a key-up condition, the program will proceed to the modulation selection routine, SELMOD, routine 370. FIG. 5b shows the program sequence for SELMOD. The SELMOD routine 370 selects one of two sequencing tasks to be performed by the paging system encoder, depending on the system status bits D1D0 which indicate the key analog and key binary signals of the paging terminal. Item 374 reads the NSTAT status bit for any keying activity. If both status bits D1D0 are binary zeros, a race condition is indicated, and decision 376 will select Item 378 giving binary priority if both analog and binary key requests are simultaneous. Item 378 will update the NSTAT variables D1D0 to a 01 condition and select the key bin routine 386.

If the NSTAT variables D1D0 show a non-zero condition, a decision 376 will select decision 380. If the system status bits D1D0 indicate an analog page, decision 380 will select the KEYAUD routine 382. If KEYAUD is not selected, the program will select decision 384. If the system status bits indicate a binary page, decision 384 will select the KEYBIN routine 386. If KEYBIN is not selected, decision 384 will select error routine 334.

Figure 6:
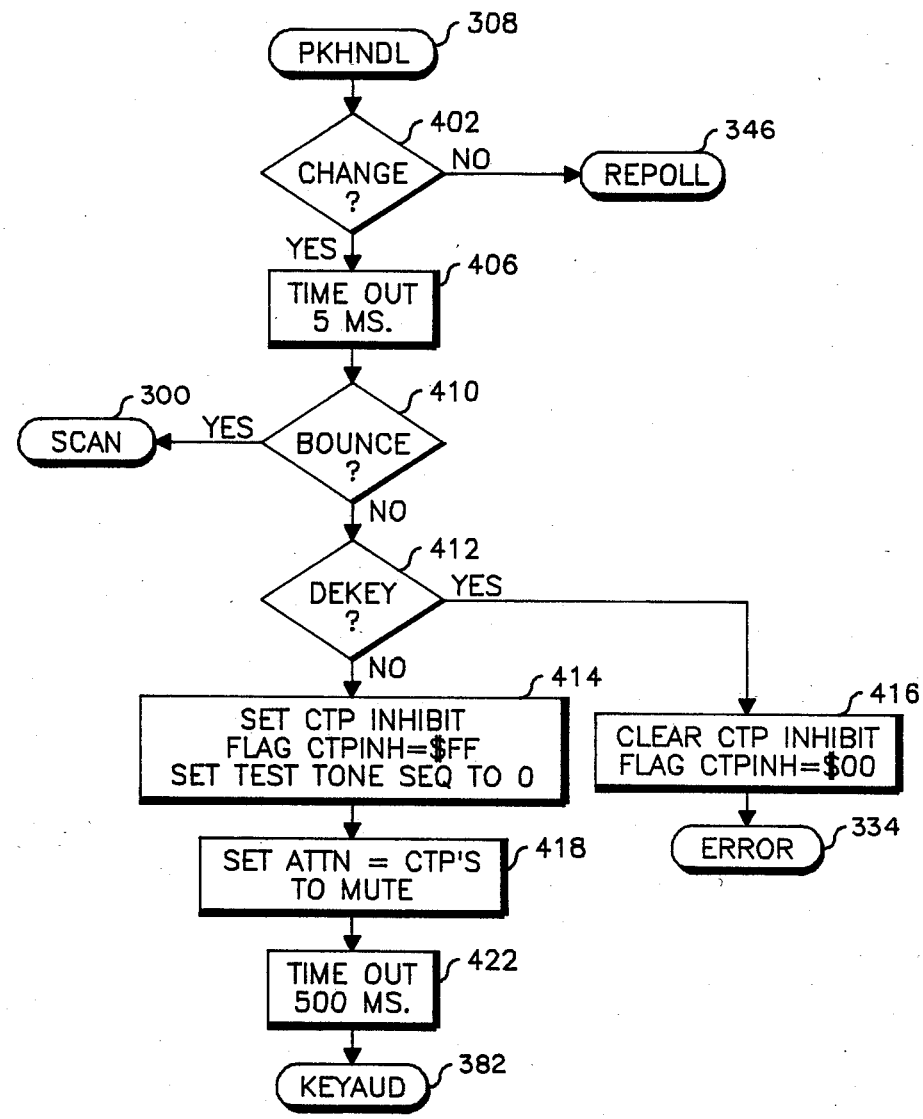

Referring now to FIG. 6, there is illustrated a flowchart embodying the panel key handler routine (PKHNDL) of the present invention. The PKHNDL routine 308 is used anytime the hardware panel key switch is activated. PKHNDL 308 begins with decision 402 which examines the NSTAT and OSTAT D6 status bits for any change. If no change is detected, decision 402 selects the Repoll routine 346. If a change is indicated, decision 402 will select item 406 which generates a 5 ms time pause in the program. Decision 410 examines the D6 data bit for a key bounce. If a key bounce is detected, program control will be returned to the SCAN routine 300. If a key bounce is not detected, the program proceeds to decision 412 which selects item 416, if a dekey command has been detected. Item 416 then clears the clear-to-page inhibit flag, and the program proceeds to the ERROR routine. No real error has occurred here, but the ERROR routine provides a proper status reset for a panel key operation.

If a dekey command is not detected, decision 412 will select item 414, sets the clear-to-page inhibit flag and sets the test tone sequence to step 0. Item 418 then sets the programmable attenuator 140 and audio switches 118, 120, 124 and 125 to the mute condition. Item 422 then provides a 500 millisecond time delay before selecting the KEYAUD routine 382, since a hardware panel key can only activate the analog mode.

Figure 7:
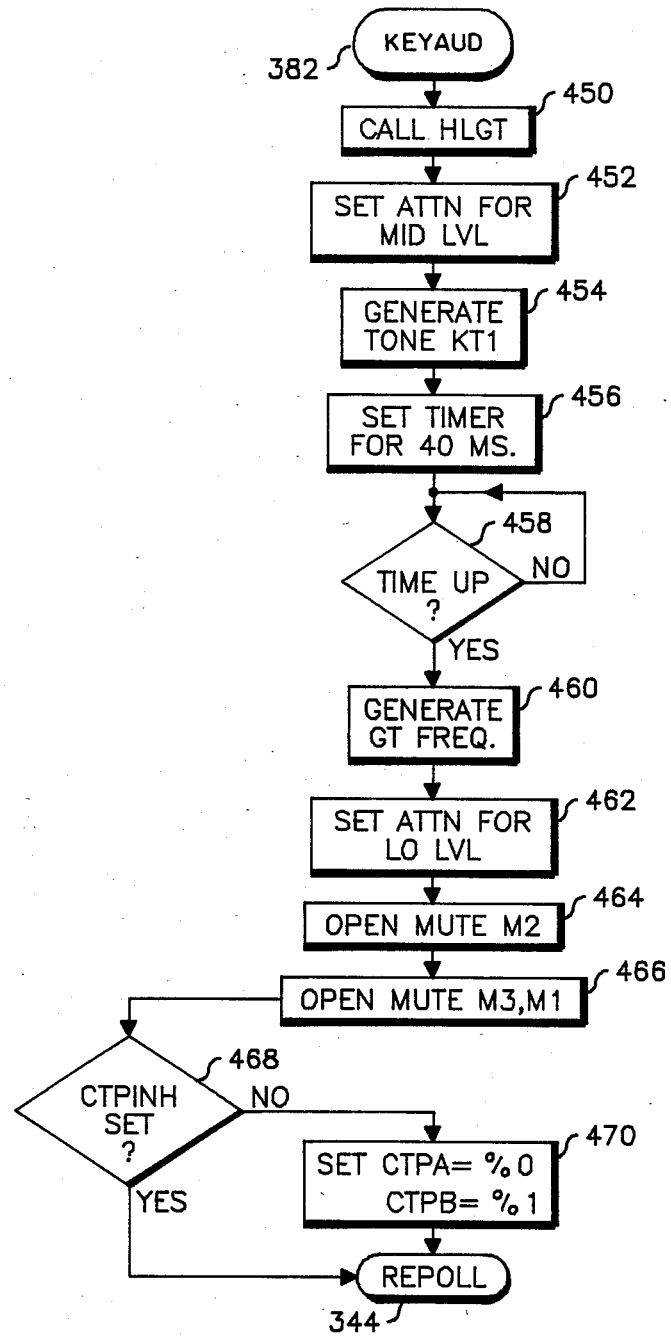

FIG. 7 shows a flowchart embodying the analog key-up routine (KEYAUD) 382 of the present invention. KEYAUD 382 is selected when the paging system encoder is to key up in the analog mode. KEYAUD sequences the tone attenuator, calls the tone sequencer and enables the tone and audio signal paths. It then signals the paging terminal when the paging system is clear to page.

When selected, KEYAUD proceeds to item 450 which selects the high level guard tone subroutine (HLGT) 450. HLGT causes the high-level guard tone sequence to be placed at the output of the paging encoder. This will be discussed in more detail later. When completed, HLGT returns program control to item 452 which adjusts the programmable attenuator 140 of FIG. 3 for mid-level attenuation. Item 454 then sets the ENCINC or tone generator register to produce the function tone frequency. Item 456 and decision 458 cause the function tone to be produced by the microprocessor for 40 ms. When the function tone period has elapsed, the program will proceed to item 460 to generate a guard tone signal the program will proceed to item 462 which adjusts the programmable attenuator 140 of FIG. 3 to a low level corresponding to the level required by the low level guard tone. Subsequently, item 464 opens mute switch 124 and item 466 opens the mute switches 120, 125. Decision 468 examines the clear to page inhibit flag. If the clear to page inhibit flag is set, because of a hardware panel key, the decision 468 will select the REPOLL routine 344. If the clear to page inhibit flag is not set, decision 468 will select item 470 which enables the clear to page analog line and inhibits the clear to page binary line.

Figure 8:
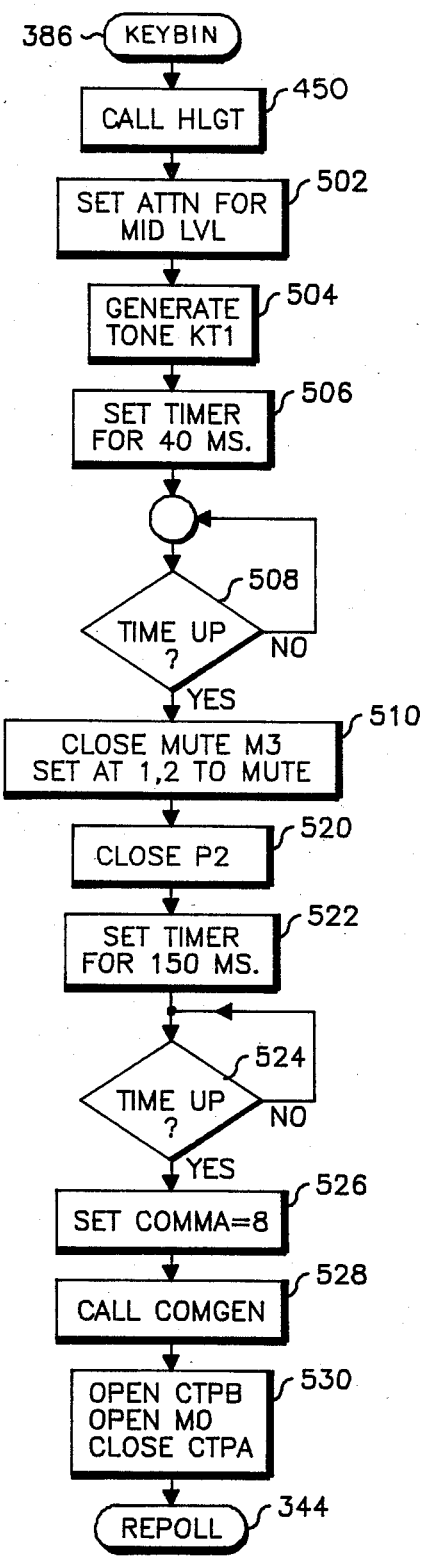

Referring now to FIG. 8, there is illustrated a flowchart embodying the binary key routine (KEYBIN) of the present invention. When activated, KEYBIN proceeds to item 500 which calls the HLGT routine 450. When executed, HLGT will return program control to item 502 which adjusts the programmable attenuator 140 of FIG. 3 for mid-level attenuation. The program then proceeds to item 504 which adjusts the ENCINC register to produce the function tone frequency. Decision 508 causes this tone to be placed at the output of the paging encoder for 40 ms. The program then executes item 510 which sets the programmable attenuator 140 of FIG. 3 and mutes attenuator mute switch 125.

Item, 520 then designates microcomputer port P2 as an input, thus inhibiting any tone output from the microprocessor. Item 522 and decision 524 then cause the microprocessor to pause for a time period so that a 150 ms. pause will appear at the output of the paging encoder. When 150 ms. has elapsed, item 526 sets the "comma" counter for the desired number of comma cycles, and Item 528 calls the comma routine 528. This will be discussed in more detail later. The program then proceeds to Item 530 which enables the clear to page binary line, inhibits the clear to page analog line and opens the binary modem tone signal path. The program then selects the REPOLL routine 344.

Figure 9:
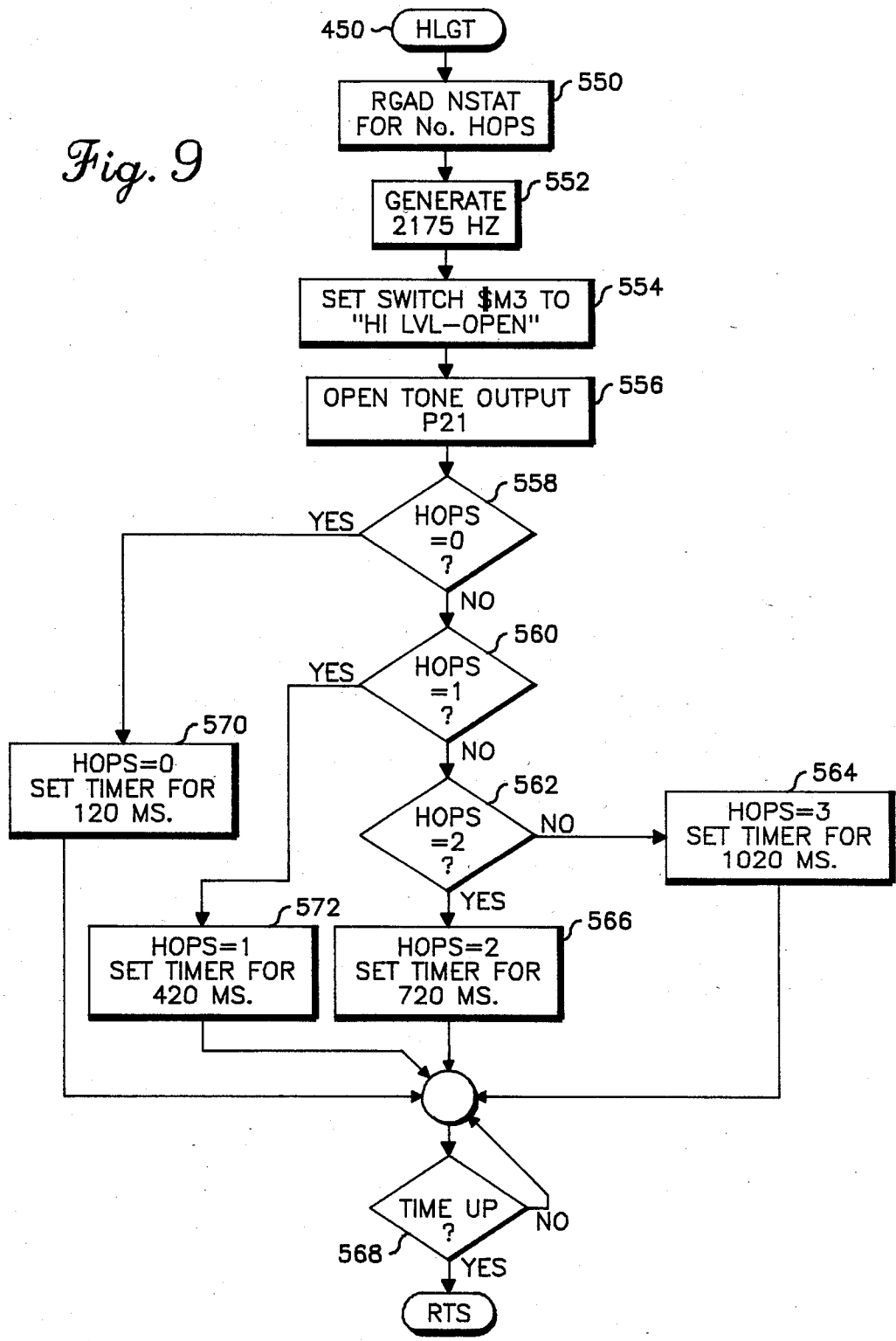

Referring now to FIG. 9, there is illustrated a flowchart embodying the High-level guard tone (HLGT) routine of the present invention. The High-level guard tone signal signals a paging transmitter site that a paging signal is imminent and the transmitter should turn on. In a system which uses link stations to connect the remote stations, additional periods of High-level guard tone are required to allow each station along the link to receive the High-level guard tone frequency.

The HLGT routine begins with item 550, which reads the NSTAT Hop select data bits D2D3 which reflect the user selectable internal hardware condition of switches which provide information as to how many link transmitters are in use and subsequently, what time period of High-level guard tone is required. The program then proceeds to item 552 which adjusts the ENCINC register to generate a guard tone frequency. Item 554 then adjusts the programmable attenuator 140 of FIG. 3 for high level or minimum attenuation and then opens the microcomputer tone mute switch 125. Item 556 then designates microprocessor port p21 of FIG. 3 as an output, thus enabling the tone output of the microprocessor. The program then proceeds to decisions 558, 560, 562 which examine the NSTAT status bits D2D3 to determine the number of HLGT periods required. If no additional guard tone is required, decision 558 will select item 570 which will cause HLGT to be generated for 120 ms. Similarly, if one transmitter hop is required, decision 560 will select item 572, which will cause HLGT to be generated for 420 ms. If two hop periods are required, decision 562 will select item 566 which will cause HLGT to be generated for 720 ms. Otherwise, item 564 will be selected, and HLGT will be generated for 1020 ms. Decision 568 examines items 570, 572, 566 or 564 and evaluates the elapsed time depending on which item was selected. When the HLGT sequence has elapsed, decision 568 will return the program control to the subroutine which selected the HLGT routine.

Figure 10:
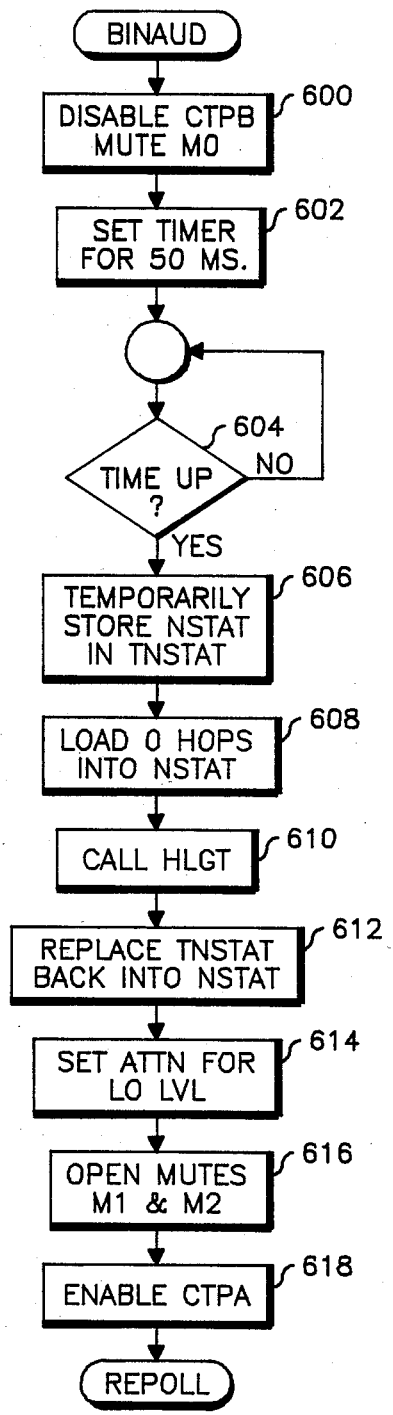

FIG. 10 shows a flowchart demonstrating the Binary to Analog (BINAUD) routine of the present invention. BINAUD is involved whenever the paging system is transmitting in a binary mode and shift to the analog paging mode is required. BINAUD causes the paging system to wait for 50 ms., then provides high-level guard tone, then low-level guard tone to the paging transmitters. The tone and voice signal paths are enabled, and the clear to page analog signal is activated.

BINAUD begins with item 600 which inhibits the clear to page binary signal and mutes the binary modem tone signal path, thus terminating the binary signal transmission. Item 602, then activates the timer routines and decision 604 causes the paging encoder to generate a 50 ms pause. When 50 ms has elapsed, item 606 stores the NSTAT status byte in a temporary location. Item 608 then loads a new value into the NSTAT status byte which indicates that zero transmitter hops are required. As noted previously, the system status bits D2D3 indicate a number of link transmitters in a system which would require an additional High-level guard tone signal. However, since the paging system is already transmitting, additional high-level guard tone is not required, and, therefore, item 608, temporarily loads a zero value into the D2D3 system status bits of NSTAT. The program then proceeds to item 610 which calls the HLGT routine which generates the high-Level guard tone frequency. When HLGT has been executed, the program proceeds to item 612 which restored the NSTAT byte with the value previously set aside in the temporary NSTAT location. Item 614 then sets the programmable attenuator 140 of FIG. 3 for high attenuation so that the microprocessor will continue to generate low-level guard tone which is required to keep the paging transmitters in the analog paging mode. Item 616 then opens the paging tone and voice signal paths by opening mute switches 120 and 124 of FIG. 3. Item 618 then enables the clear to page analog signal, and the program then selects the REPOLL routine.

Figure 11:
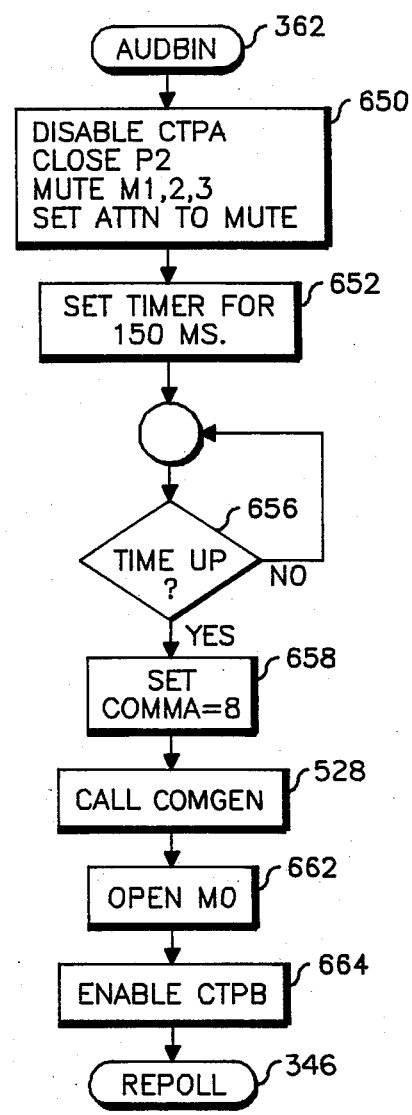

Referring now to FIG. 11, there is illustrated a flowchart embodying analog to binary transition routine (AUDBIN) 362. The AUDBIN routine provides the paging system encoder control sequence required for a mixed mode paging transition from analog to binary. The AUDBIN routine causes the paging system encoder to mute all audio signal paths, waits 150 ms and then generates a burst of comma tones which causes the paging transmitters to enter the binary transmission mode. The binary modem signal path is then opened, and the clear to page binary signal is enabled.

The AUDBIN routine 362 begins with item 650 which updates the PIA port B designations. Item 650 disables the clear to page analog signal, mutes all open audio paths and adjusts the programmable tone attenuator for maximum attenuation.

The program then proceeds to item 652 which sets the timer routine to generate a 150 ms time period. The timer routine will be discussed in more detail later. Decision 656 then checks for the termination of the 150 ms time-out period. Item 658 then adjusts the comma counter to generate 8 comma sequences, and item 528 then executes comma generator (COMGEN) routine 528 which causes the paging transmitters to enter the binary transmission mode. Item 662 then opens the binary modem tone mute switch 118 of FIG. 3. The program then proceeds to item 664 which enables the clear to page binary signal. The program then selects the REPOLL routine 346.

Figure 12:
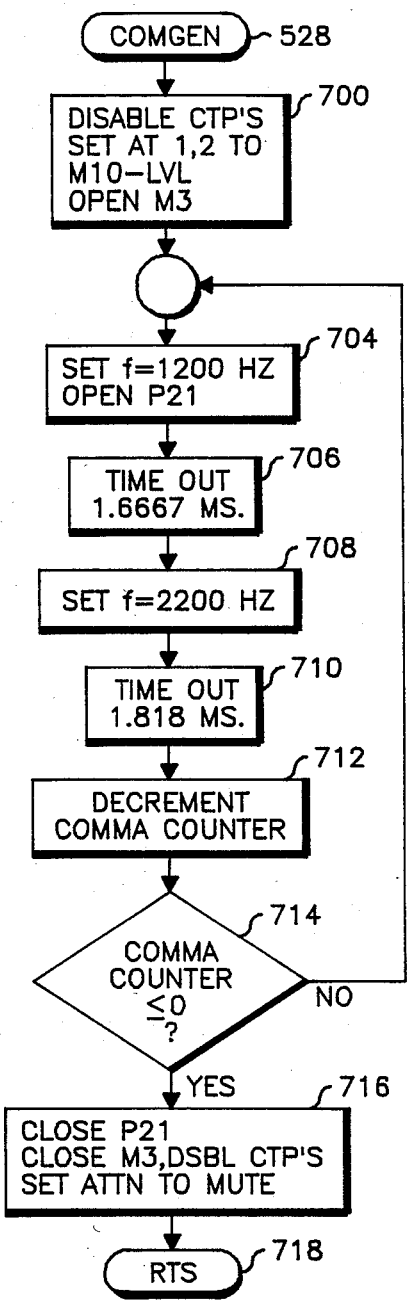

Referring now to FIG. 12, there is illustrated a flowchart embodying the binary comma generator routine (COMGEN) of the present invention. COMGEN generates a burst of (N) mark-space modem tone sequences of standard tone frequencies at 1200 Hz or 2200 Hz for asynchronous modems.

COMGEN begins with item 700 which disables all clear-to-page signals, opens the modem tone mute switch 128 of FIG. 3 and adjusts the programmable attenuator 140 of FIG. 3 for mid-level attenuation. The program then proceeds to item 704 which instructs the microprocessor to generate a 1200 Hz signal by loading the ENCINC register and designating microcomputer port P2 as an output. Item 706 then generates a time period which causes the 1200 Hz signal to be generated or 1.6667 ms. This signal comprises a FSK binary one. The program then proceeds to item 708 which instructs the microprocessor to generate a 2200 Hz signal by addressing the ENCINC register item 710 and then causes the 2200 Hz signal to be generated for 1.818 ms. This signal comprises a FSK binary zero. When this time has elapsed, item 712 will decrement the comma counter which was initialized by the routine utilizing the COMGEN routine. Decision 714 examines the comma counter register. If the comma counter is currently a non-zero value, decision 714 will return program control to item 704. If the comma counter contains a zero value, the program will proceed to item 716 which designates microcomputer port P2 as an input, thus inhibiting the microprocessor tone generator. Item 716 also closes the attenuator mute switch, disables all clear-to-page signals and sets the programmable attenuator or maimum attenuation. Item 718 then returns program control to the routine which activated COMGEN.

Referring now to FIG. 13, there is illustrated a group of flowcharts embodying the time delay generator routines of the present invention. These routines are utilized whenever the microprocessor is required to generate tones or pauses for a specific period of time, as well as any other task which requires a timekeeping function.

FIG. 13a shows a flowchart illustrating the timer set routine TSET which is called by background routines anytime an elapsed time timer is to be set up. The microprocessor 144 of FIG. 3 utilizes a 16-bit free-running counter register (FRR) to generate time information. In addition, a second 8-bit register (TIME) is utilized. Whenever the free-running register contains all binary one's, an overflow will activate the TOFIN interrupt routine which will increment the value stored in TIME. Therefore, subsequent overflows will be accumulated in TIME via the TOFIN interrupt routine.

The TSET routine 750 begins with item 752 which saves the values stored in FRR and the index register. The program proceeds to item 754, and captures the present time as indicated by the value of FRR. Item 756 then retrieves the required time delay value and adds this value to the value stored in FRR (most significant byte of FRR) and TIME. This target value will be an indication of the value of most significant byte of FRR and TIME when the desired time has elapsed. Item 758 then restores the registers and stores the computed time in a target register, (TARGET), and program control returns to the routine which activated TSET.

FIG. 13c illustrates a flowchart showing the timer interrupt overflow routine (TOFIN) of the present invention. This routine is entered every time the value stored in FRR increments to a value represented by a binary one in every bit of the register.

TOFIN begins with item 770 which clears the timer overflow interrupt flag allowing the timer to generate an interrupt during the subsequent timeout. Item 772 then increments the value stored in TIME. Item 774 then services the watchdog timer. The watchdog timer is a hardware device which prevents runaway conditions in the microcomputer 144. If the watchdog timer is not addressed within a predetermined period, the timer will reset the microprocessor. Item 774 will then return program control to the routine being executed when the interrupt occurs.

FIG. 13b shows the timer compare interrupt handler routine (TONOUT) which generates a square-wave signal, and is used for tone encoding. TONOUT generates a tone frequency based on the value stored in the ENCINC register. TONOUT can generate frequencies which range from 300 to 3000 Hz.

TONOUT is activated anytime the value of an internal register (TCOMPR), related to the value of ENCINC, is equal to the value of the free-running register. When the TCOMPR value is equal to the value of the free-running register, an interrupt will activate TONOUT 760. Item 762 will then toggle the microprocessor port P2. Item 764 then updates the TCOMPR register to generate an interrupt a half period later. Item 764 subsequently returns the program control to wherever the program was when it was interrupted.

Figure 14:
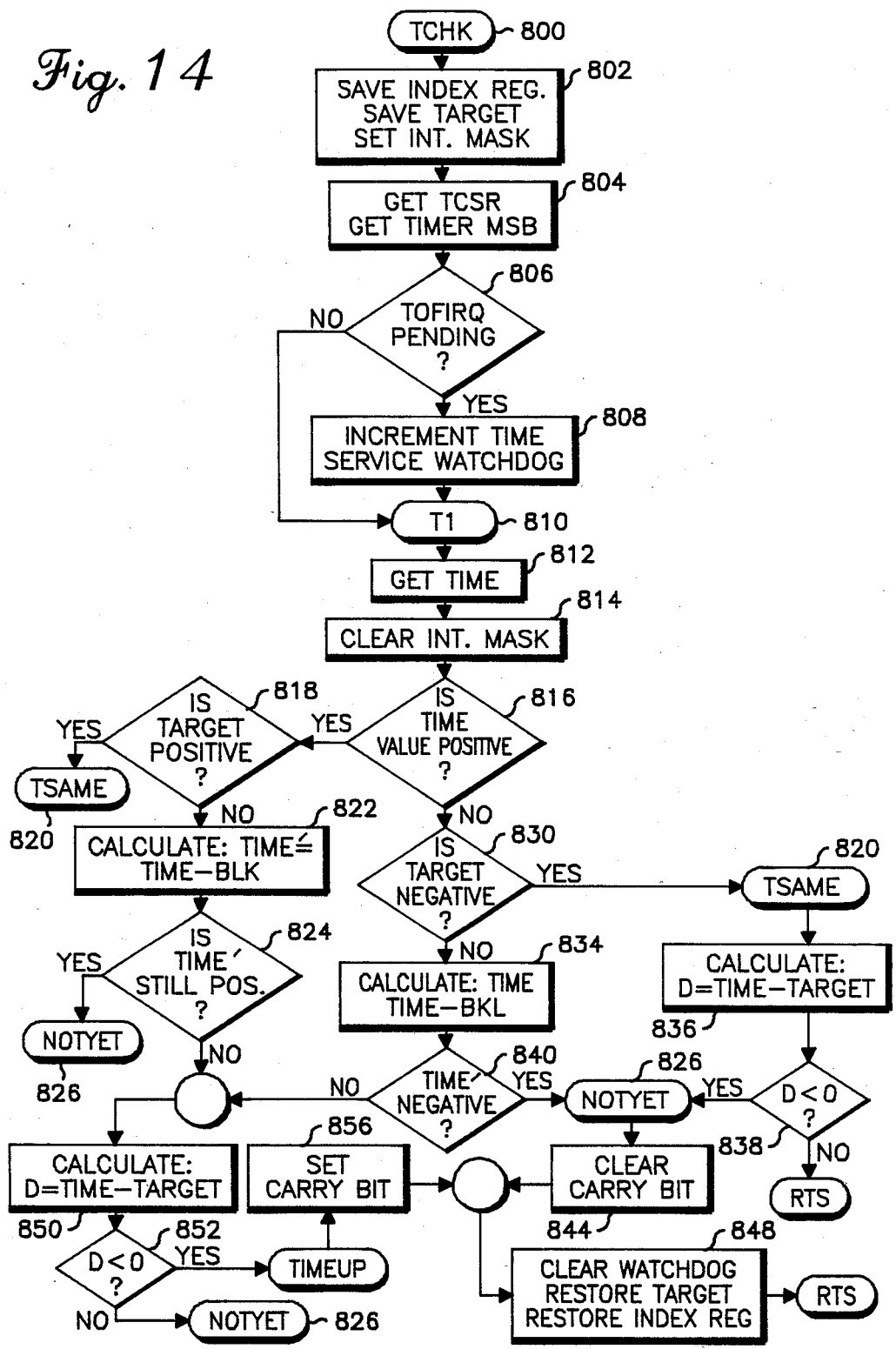

Referring now to FIG. 14, there is illustrated a flowchart embodying the timer check routine TCHK of the present invention. The TCHK routine decides whether the timer interval, previously established by the TSET routine, has elapsed. It is called by the background routines which utilize the target parameter of FIG. 13. TCHK captures the present time from TIME and the M.S. byte of FRR in Items 804 and 812. Item 802 saves the TARGET time value.

Items 816 thru 856 test present time compared to TARGET time. If present time equals or exceeds TARGET, TCHK returns control to the calling routine with Carry Bit Set. Otherwise control is returned with Carry Clear.

The mathematics of checking for "greater than" or "less than" is complicated by the fact that the incremented TIME value will eventually set the most significant bit. Once set, TIME is considered a Negative number for math functions and would test as "less than" the TIME value just before the MSB was set. Much of the logic discussed below deals with reconciling this anomaly.

TCHK 800 begins with item 802 which saves the values contained in the index and target registers and sets the interrupt mask 804. Item 804 retrieves the value stored in the TCSR register and also retrieves the value of the TIME register and FRR most significant byte. If these values indicate that an interrupt which would activate TOFIN is pending, decision 806 will select item 808 which increments the value stored in TIME and resets the watchdog timer. The program will then proceed to item 812. If an interrupt is not pending, decision 806 will select item 812 directly. Item 812 retrieves the value stored in TIME, and item 814 clears the interrupt mask.

Decision 816 compares the values of the previously stored TARGET and TIME registers. If the values stored in TIME have the same sign the program will proceed through decision 818. If the target value is also positive decision 818 will direct program control to TSAME by selecting item 836, which calculates the differnce between the TIME and TARGET registers. If TIME minus TARGET is greater than zero, decision 838 will return program control to the subroutine which selected TCHK. If the value of TARGET minus TIME is less than zero, the program proceeds to the NOTYET routine 842 by selecting item 844. Item 844 clears the carry bit. The program then proceeds to item 848 which resets the watchdog timer and restores the TARGET and index registers and returns program control to the subroutine which selected TARGET.

Referring back to decision 818, if the value stored in time is positive, and the value stored in target is negative, decision 818 selects item 822 which calculates a new value for TIME based on an estimate of the maximum amount of time which could have elapsed since the routine was activated. This new value is known as the latency period. If the new value of TIME is still positive, the routine will select NOTYET 826. If this new value of time is now negative, the program will proceed to COMMON 828.

Referring now to decision 816, if TIME is negative, the program selects decision 830. If the value stored in TARGET is negative, the program proceeds to TSAME 832. If the value stored in TARGET is positive, decision 830 will select item 834, which calculates a latency period in eactly the same manner as item 822. Item 834 then proceeds to decision 840 which evaluates the new value of time.

If the new value of TIME shows a negative value, the program will proceed to NOTYET 842. If the new value of TIME is positive, decision 840 will select COMMON 828.

COMMON 828 begins with item 850 which calculates a value equivalent to TIME-TARGET. The program then proceeds to decision 852. If the new calculated value is negative, decision ]52 selects item 856 which sets the carry bit and then selects the RET routine 846. If the new calculated value is positive, decision 852 selects the NOTYET routine 826.

In summary, a paging system encoder capable of generating a series of timed tones and pauses in accordance with a predetermined signalling scheme has been described. The paging system encoder provides signals which instruct a paging base station encoder to key in an analog or binary modulation mode or to make a transition from one mode to another. Accordingly, other modifications, uses and embodiments will be apparent to one skilled in the art without departing from the spirit and scope of the principles of the present invention.

What is claimed is:

1. A method of formatting control tones, binary information signals and analog information signals for outputting thereof to a paging base station, over a single linking channel which allows the base station to continuously transmit a sequential analog or binary signal without dekeying the base station transmitter between said analog or binary signals, said method including the steps of:
   (a) sequentially transmitting first and second control tones for a predetermined period of time over said linking channel to activate said base station for the transmission of an analog or binary paging signals;
   (b) in response to an analog key request input immediately outputting over said linking channel for transmission by said base station, an analog information signal followed by a pause and then, in response to a binary input, outputting a binary information signal; and
   (c) in the absence of said analog key request input, generating a pause for a predetermined period of time following said second control tones, and, in response to a binary key request input, outputting over said linking channel for transmission by said base station a binary information signal.

2. A paging transmitter remote control encoder for cooperating with a paging terminal and receiving paging signals comprising binary modem tones, audio paging tones and voices audio from said paging terminal and combining said paging signals with transmitter control tones, said encoder comprising:
   (a) means for inputting the paging signals;
   (b) means responsive to paging requests from a paging terminal;
   (c) means for inputting paging terminal first and second control signals, said paging terminal control signals indicating analog or binary paging information is available for transmission;
   (d) means for outputting paging terminal third and fourth control signals indicating proper time to release said paging information;
   (e) means coupled to said input means for amplifying and equalizing said inputted paging signals;

(f) means for outputting an encoder output signal, said encoder output signal comprising the inputted paging signals;

(g) means for selectively coupling said paging signals in a predetermined sequence between said amplifying and equalizing means and said output means;

(h) means for inputting a local override of paging encoder control signals for halting encoder operation in a predetermined state; and (i) means for selectively gating said third and fourth paging terminal control signals for arbitration if said first and second control signals appear simultaneously.

3. The apparatus of claim 2 wherein said first and second terminal control signals comprise an analog or binary page request indication.

4. The apparatus of claim 2 wherein said third or fourth terminal control signals include an analog or binary clear-to-page indication.

5. The apparatus of claim 3 wherein said first or second signals indicate a key request from terminal to encoder.

6. The apparatus of claim 4 wherein said third and fourth signals comprise a clear to page from encoder back to terminal busying the terminal until paging information can be accepted by the encoder.

7. The apparatus of claim 4 wherein said third and fourth signals comprise a means of arbitration between multiple terminal inputs for orderly flow of paging information without dekeying base stations.

8. The apparatus of claim 4 wherein said third and fourth signals comprise a means of arbitration between analog and binary sections of a paging terminal allowing orderly flow of paging information without dekeying base stations.

9. A method for encoding simulcast transmitter remote control signals for cooperating with a paging terminal and receiving paging signals comprising binary modem tones, audio paging tones and voice audio from said paging terminal and combining said paging signals with transmitter control tones, said method comprising the steps of:

(a) amplifying and equalizing said inputted paging signals;

(b) inputtting first and second paging terminal control signals, said paging terminal control signals indicating analog or binary paging information is available for transmission;

(c) outputting third and fourth paging terminal control signals indicating the proper time to release said paging information;

(d) selectively gating said third and fourth paging terminal control signals for arbitration if said first and second control signals appear simultaneously;

(e) inputting the paging signals;

(f) selectively coupling said paging signals in a predetermined sequence, and outputting an encoder output signal; and (g) inputting a local override of paging encoder control signals for halting paging encoder operation in a predetermined state.

* * * * *